United States Patent

Goossens

[15] 3,674,739
[45] July 4, 1972

[54] ORGANOSILYLAMINES REACTION BETWEEN ORGANOSILYLAMINE AND A SILANOL-CONTAINING ORGANOSILICON MATERIAL

[72] Inventor: John C. Goossens, Scotia, N.Y.
[73] Assignee: General Electric Company
[22] Filed: Feb. 9, 1970
[21] Appl. No.: 14,690

Related U.S. Application Data

[62] Division of Ser. No. 603,115, Dec. 20, 1966, Pat. No. 3,497,539.

[52] U.S. Cl...............260/46.5 G, 260/37 SB, 260/46.5 E, 260/46.5 P, 260/47 R, 260/448.2 N, 260/825
[51] Int. Cl..........................................C08f 11/04
[58] Field of Search................260/46.5 E, 46.5 G, 46.5 P, 260/825 R, 47 R, 448.2 N

[56] References Cited

UNITED STATES PATENTS

| | | | |
|---|---|---|---|
| 3,305,525 | 2/1967 | Goossens | 260/46.5 |
| 3,032,528 | 5/1962 | Nitzsche et al. | 260/46.5 |
| 3,219,726 | 11/1965 | Bailey et al. | 260/825 |
| 2,562,000 | 7/1951 | Sveda | 260/46.5 |
| 3,202,634 | 8/1965 | Merker | 260/46.5 |
| 3,338,870 | 8/1967 | Nitzsche et al. | 260/46.5 |
| 3,135,777 | 6/1964 | Nielson | 260/448.2 |
| 3,398,175 | 8/1968 | Leitheiser | 260/448.2 |

Primary Examiner—Donald E. Czaja
Assistant Examiner—M. I. Marquis
Attorney—William A. Teoli, Robert S. Friedman, Frank L. Neuhauser, Oscar B. Waddell and Melvin M. Goldenberg

[57] ABSTRACT

Bis-organoaminosilalkylenes and bis-organoaminosilarylenes are used to couple silanol stopped fluids to form gums. The process is fast and the molecular weights of the gums formed are very high with no deleterious byproduct formed during the gum formation. The gums which contain recurring silarylene units are used to make silicone rubber. The rubbers formed have the radiation resistance, hydrolytic stability and high temperature properties which are known characteristics of polysiloxanes containing silarylene groups.

3 Claims, No Drawings

ORGANOSILYLAMINES REACTION BETWEEN ORGANOSILYLAMINE AND A SILANOL-CONTAINING ORGANOSILICON MATERIAL

This application is a division of copending application Ser. No. 603,115, filed Dec. 20, 1966 now U.S. Pat. No. 3,497,539.

The present invention relates to certain organosilylamines and to the employment of these materials in combination with silanol containing organosilicon materials to provide for the production of higher molecular weight reaction products.

The organosilylamines included by the present invention are shown by the formula, (1)  

where Y is a monovalent amino radical selected from —NZZ' and a heterocyclic amino radical, where Z is selected from alkyl radicals and Z' is selected from hydrogen and alkyl radicals, R is selected from monovalent hydrocarbon radicals, and halogenated monovalent hydrocarbon radicals, R' is a divalent radical selected from alkylene radicals, arylene radicals, alkylenearylenealkylene radicals, alkyleneoxyalkylene radicals, alkyleneoxyarylene radicals, aryleneoxyarylene radicals, and R"TR" radicals, where R" is selected from alkylene and arylene radicals, T is selected from

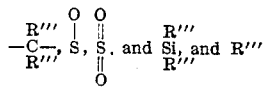

is selected from hydrogen and R radicals.

Radicals included by R of Formula (1) are for example, alkyl radicals, such as methyl, ethyl, propyl, butyl, hexyl, heptyl, octyl, etc. Aryl radicals and haloaryl radicals such as phenyl, xylyl, tolyl, chlorophenyl, etc., aralkyl radicals such as phenylethyl, benzyl, etc., alkenyl radicals and cycloalkenyl radicals such as vinyl, allyl, cyclohexenyl, cycloheptenyl, etc.; alkynyl radicals such as ethynyl, 1-propynyl, etc. Radicals included by R' are for example, alkylene radicals, such as methylene, ethylene, trimethylene, tetramethylene, etc.; arylene radicals such as phenylene, tolylene, xylylene, naphthylene, etc.; alkyleneoxyalkylene radicals such as ethyleneoxyethylene, ethyleneoxytrimethylene, etc., alkyleneoxyarylene such as tetramethyleneoxyphenylene, dimethyleneoxyxylyene, etc.; aryleneoxyarylene such as phenyleneoxyphenylene, phenyleneoxytolylene, etc. In addition R' can be radicals such as

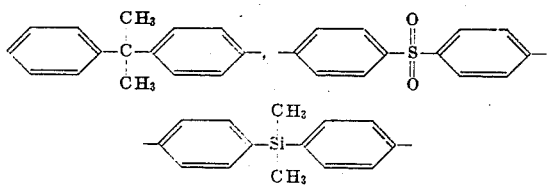

etc. Radicals included by Y are for example, pyrrolidino, piperidino, and morpholino, as well as radicals such as ethylamino, methylethylamino, dimethylamino, diethylamino, cyclohexylamino, etc. Where R, R', R", R''' can be more than one radical respectively, these radicals can be all the same or any two or more of the aforementioned radicals.

The organosilylamines of Formula (1) can be made by effecting contact at temperature in the range of between —30° to 180° C, between an aliphatic or heterocyclic amine and halosilylorgano compounds of the formula, (2)  

where R and R' are defined above, and X is a halogen radical, for example, chloro, bromo, fluoro, etc. Solvents which can be utilized to facilitate the formation of products and separation of amine salts are for example, hexane, toluene, tetralin, etc. Recovery of the organosilylamine can be achieved by separation of salts followed by distillation, in accordance with standard procedures.

Methods for making some of the halosilylorgano compounds of Formula (2) are well known, and are shown by Sveda U.S. Pat. No. 2,561,429. For example, a dihalosilane such as dimethyldichlorosilane can be reacted with halogenated aromatic hydrocarbon such as p-dibromobenzene employing metallic magnesium and anhydrous ethyl ether. In addition to the Grignard reaction other organometallic reagents can be employed such as organolithium compounds, in accordance with the method of G. Baum, Journal of Organic Chemistry, 23, 480 (1958). There also can be utilized addition of silanes having hydrogen attached to silicon to aliphatically unsaturated radicals of various organic compounds such as diallyl ether, or the platinum catalyzed addition of a silane having hydrogen attached to silicon to a silane having aliphatically unsaturated hydrocarbon radicals attached to silicon. Some of these methods are shown in Lamoreaux U.S. Pat. No. 3,220,972 and Ashby U.S. Pat. Nos. 3,159,601 and 3,159,662 which are assigned to the same assignee as the present invention.

There are included by the organosilylamines of Formula (1) compounds of the formula.

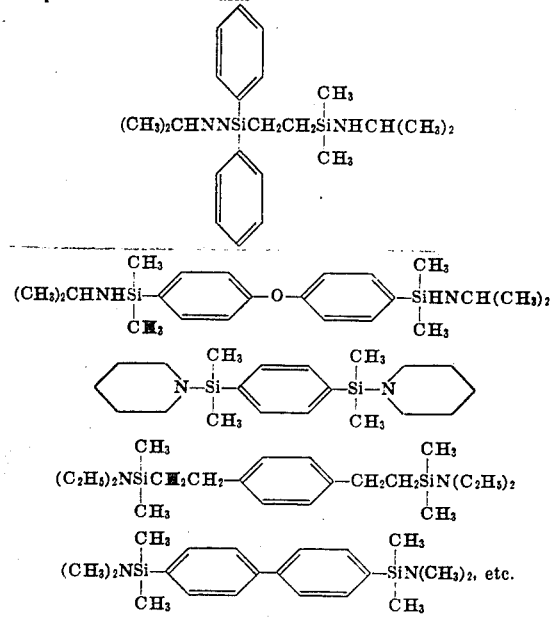

Some of the halosilylorgano compounds of Formula 2 are for example,

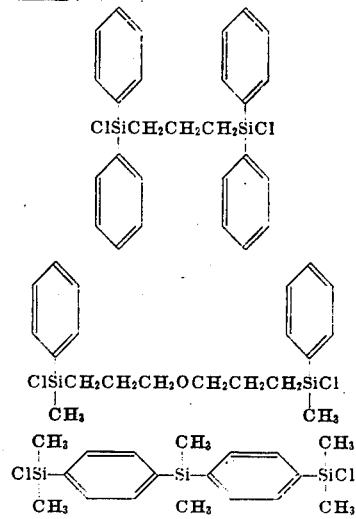

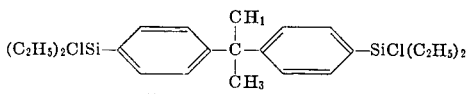

Included by the aliphatic and heterocyclic amines which can be reacted with the halosilylorgano compounds of Formula (2) to produce the organosilylamines of Formula (1) are for example, dimethylamine, diethylamine, isopropylamine, n-butylamine, methylethylamine, etc., piperidine, pyrrolidine, and morpholine.

As shown in my copending application Ser. No. 452,933 filed May 3, 1965 U.S. Pat. No. 3,305,525, which is assigned to the same assignee as the present invention, there is described a method for making organosilicon polymers utilizing silylamines of the formula, $$YSiR_2Y, \quad (3)$$

and $$YSiR_2(OSiQ_2)_nOSiR_2Y, \quad (4)$$

by contacting such materials with certain silanol containing organosilicon materials, where R is as previously defined, Q is selected from R radicals and cyanoalkyl radicals, and $n$ is an integer equal to 1 to 1,500, inclusive.

It is also the object of the present invention to provide a method for making organosilicon polymers by contacting silanol containing material consisting essentially of chemically combined diorganosiloxy units of the formula, $$Q_2SiO, \quad (5)$$

with organosilylamines of Formula (1), or silylamines of the formula, (6) $\quad YSiR'Si(OSiQ_2)_nOSiR'SiY$ with $R$ $R$ $R$ $R$ and optionally in the presence of hydroxy containing material of the formula, $$Q(Q_2SiO)_mH, \quad (7)$$

or silylamine of the formula, $$R_3SiY, \quad (8)$$

to provide for the production of organosilicon polymers consisting essentially of chemically combined $Q_2SiO$ units and $$\begin{matrix} R & R \\ SiR'SiO \\ R & R \end{matrix}$$

units, where the ratio of the sum of R and Q radicals to silicon has a value in the range of between about 1.95 to 2.4, inclusive, where R, R', Y are as defined above, Q is selected from R radicals and cyanoalkyl radicals, $n$ is an integer equal to from 1 to 1,500, inclusive, and $m$ is an integer equal to from 3 to 1,000, inclusive.

Included by the silanol containing organosilicon materials consisting essentially of chemically combined di-organosiloxy units of Formula (5), are silanol-terminated diorganopolysiloxanes of the formula, (9) $\quad HO{-}[\begin{matrix}Q\\Si O\\Q\end{matrix}]_n{-}H$ where $n$ is an integer equal to 1 to 1,500, inclusive.

The above silanol-terminated diorganopolysiloxane can be made by standard hydrolysis procedures involving the hydrolysis of diorganodihalosilanes of the formula, $Q_2SiX_2$. Equilibration of cyclic polydiorganosiloxanes, or mixtures thereof, included by the formula $(Q_2SiO)_b$, where Q can be for example, methyl or phenyl, and $b$ is an integer equal to 3 to 8, inclusive, can provide for higher molecular weight silanol-terminated diorganopolysiloxanes. Controlled amounts of water can be added to the polymer to achieve the desired final viscosity. Silanol-terminated diorganopolysiloxanes produced by the reversion of higher molecular weight organopolysiloxanes preferably have a viscosity between 200 to 50,000 centipoises at 25° C. Included by the silanol-terminated diorganopolysiloxanes of Formula (9) are polymers consisting essentially of dimethylsiloxy units and copolymers of dimethylsiloxy units with one or more members selected from diphenylsiloxy units, methylphenylsiloxy units, methylcyanoethylsiloxy units, methyltrifluoropropylsiloxy units, etc. These polymers can have major amounts of either diphenylsiloxy units, or dimethylsiloxy units.

The silanol containing organopolysiloxanes of Formula (7) can be made by equilibrating a mixture of from 0.01 to 20 mole percent of $Q_3SiO_{0.5}$ units, and 80 mole percent to 99.9 mole percent of $Q_2SiO$ units. The silanol containing organopolysiloxanes of Formula (9) can contain from 0.02 to 18 percent by weight of hydroxy radicals attached to silicon, based on the total weight of silanol-containing organopolysiloxane.

There are provided by the method of the present invention organosilicon fluids having viscosities from about 30 centipoises to as high as 100,000 centipoises, or higher at 25° C, which can be silanol-terminated, or terminated with $Q_3SiO$-units or $R_3SiO$-units and consist essentially of chemically combined $R_2SiO$ units and $$\begin{matrix} R & R \\ SiR'SiO \\ R & R \end{matrix}$$

units. The employment of silylamine of Formula (8), or silanol containing organopolysiloxanes of Formula (7), in combination with the organosilylamine of Formula (1) and silanol containing organopolysiloxane of Formula (9), in an amount sufficient to provide for a ratio of the sum of Q and R radicals per silicon atom, having a value greater than 2, and up to about 2.4, inclusive, can provide for fluids having either terminal $Q_3SiO$ units, $R_3SiO$ units or a mixture of such units. In instances where silanol-terminated fluids are desired, mixtures of organosilylamines of Formula (1) and silanol-terminated organopolysiloxanes of Formula (9) can be employed which are free of silylamine of Formula (8), or silanol containing organopolysiloxane of Formula (7), where the ratio of Y radicals of organosilylamine to silanol radicals of silanol-terminated organopolysiloxane has a value less than one. Room temperature vulcanizing organosilicon compositions filled with for example, silica filler, can be made from the aforedescribed silanol-terminated organosilicon fluids by employing ethylpolysilicate in combination with a metal soap catalyst as utilized in Berridge U.S. Pat. No. 2,843,555 assigned to the same assignee as the present invention. Also, organoacyloxysilanes such as methyltriacetoxy silane can be employed which are shown in Smith et al. U.S. Pat. No. 3,293,204, also assigned to the same assignee as the present invention.

There are also provided by the present invention, organosilicon gums which can be either silanol-terminated, or terminated with $Q_3SiO$ units, $R_3SiO$ units, or mixtures thereof. These gums can have viscosities between about 500,000 centipoises to as high as 650 million centipoises at 25° C. The employment of sufficient organosilylamine of Formula (1) in combination with silanol-terminated organopolysiloxane of Formula (9) to provide for a ratio of Y radicals to silanol radicals having a value of at least one, will provide for effective results. A proportion of sufficient silylamine of Formula (8) or silanol containing organopolysiloxane of Formula (7) should be employed in combination with organosilylamine of Formula (1), and silanol-terminated organopolysiloxane of Formula (9) to provide for a ratio of the sum of Q and R radicals per silicon having a value of from greater than 2 to about 2.001 inclusive, where polymers are desired having terminal $R_3SiO$ units, $Q_3SiO$ units, or mixtures thereof.

The organosilicon polymers or gums which can be made in accordance with the practice of the invention consist essentially of chemically combined $Q_2SiO$ and $$\begin{matrix} R & R \\ SiR'SiO \\ R & R \end{matrix}$$

units, and contain less that 1 percent by weight of volatiles based on the weight of the gum. Some of the gums can be employed in applications similar to the polymer shown by Agens U.S. Pat. No. 2,448,756, Sprung et al. U.S. Pat. No. 2,448,556, Marsden U.S. Pat. No. 2,521,528, etc., all assigned to the same assignee as the present invention. These gums can be milled with 30 to 300 parts of filler, per 100 parts of gum. Such fillers include reinforcing fillers such as fumed silica, as well as extending fillers, such as titanium oxide, etc. In addition, conventional peroxide catalyst also can be incorporated. With respect to the organopolysiloxane gums made in accordance with the practice of the present invention, those consisting essentially of chemically combined dimethylsiloxy units can have molecular weights up to 2 million. The gums made in accordance with the invention contain less than 1 percent by weight of volatiles based on the weight of the gum.

For example, some of the gums which can be made in accordance with the practice of the invention can have the average formula such as

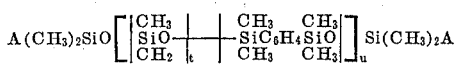

where A can be OH or $C_2H_3$, $t$ is an integer having an average value of from 3 to 6, inclusive, and $u$ is an integer having an average value of from 100 to 1,000, inclusive,

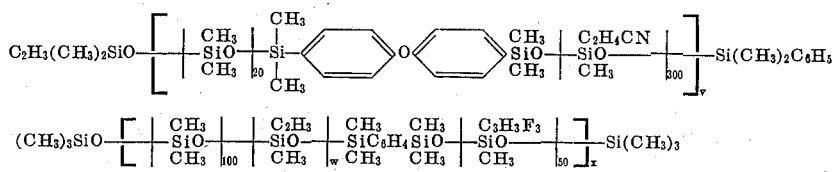

where $v$ is an integer having a value of from 2 to 30, $w$ is an integer having a value of from 2 to 3, and $x$ is an integer having a value of from 5 to 50.

The process of the present invention can be practiced by mixing the organosilylamine and the silanol containing organosilicon material at a temperature between −30° to 200° C. Preferably temperatures between −10° to 170° C can be employed. The order of addition of the various reactants is not critical. However, in instances where monofunctional silylamine of Formula (8) is employed in combination with the organosilylamine of Formula (1), it is preferred to add the monofunctional silylamine prior to the organosilylamine. An amount of 0.001 to 2 parts of monofunctional silylamine of Formula (8), to organosilylamine of Formula (1) can be employed.

It is preferred to practice the method of the invention under substantially anhydrous conditions to preclude any undue hydrolysis of Y radicals of the organosilylamine before intercondensation is achieved, with silanol containing organosilicon material. In instances where substantially anhydrous conditions are employed, rapid addition of excess silylamine can impede further intercondensation. However, the introduction of moisture will provide for further intercondensation by creating further silanol due to the hydrolysis of terminal Y radicals. Experience has shown that complete intercondensation is substantially retarded if an organic solvent is utilized. In order to facilitate stirring however, minor amounts of an inert organic solvent such as less than 10 percent by weight of the reaction mixture can be introduced to reduce the viscosity of intercondensation product. For example, benzene, xylene, toluene, and the like can be used.

Excess of the organosilylamine, beyond that quantity required to effect intercondensation of silanol with silylamine radicals, such as in amounts sufficient to provide for from one to five Y radicals, per silanol radical, can provide for effective results.

Reactions are generally most conveniently performed at atmospheric pressure conditions. However, pressures of below atmospheric can be utilized. Recovery of the desired product resulting from the contact of the organosilylamine with the silanol containing material can be readily achieved by allowing the mixture to achieve a maximum viscosity and then removing any unreacted material or byproduct at a reduced pressure.

In order that those skilled in the art will be better able to practice the invention, the following examples are given by way of illustration, and not by way of limitation. All parts are be weight.

EXAMPLE 1

There were added with stirring 280 parts of isopropylamine to a solution of 263 parts of 1,4-bis(dimethylchlorosilyl)benzene dissolved in 1,700 parts of dry toluene. The isopropylamine was added dropwise and the mixture was cooled externally with ice during the addition. When the addition was complete, the mixture was heated to 75° to 80° C for 2 hours. The amine salt was filtered off and the filtrate was distilled to yield 107.5 parts of a product having a boiling point of 110° C at 0.2 mm. Based on its infrared spectrum, the product was 1,4-bis(isopropylaminodimethylsilyl)benzene of the formula,

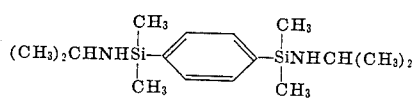

EXAMPLE 2

There was added at ½-hour intervals, 0.09 part of the organosilylamine of Example 1, to 20 parts of a silanol-terminated dimethypolysiloxane which was stirred and heated at 60° C. After about 1.2 part of the organosilylamine had been added a gum had formed having an intrinsic viscosity [η] in toluene at 25° C of 1.8 dl/g. A portion of this gum was compounded with 40 parts of fumed silica and 2 percent by weight of the gum of benzoyl peroxide. A 20-mil sheet was press-cured at 150° C for 10 minutes. There was obtained an elastomer having a tensile of 600 (psi) and an elongation of 250 (percent).

EXAMPLE 3

There were added 49 parts of dimethylchlorosilane to a mixture of 58 parts of dimethylvinylchlorosilane and 30 parts, per million of the resulting mixture, of a platinum catalyst shown by Lamoreaux U.S. Pat. No. 3,220,972 while the mixture was stirred. The addition was performed at a temperature of 65° C. After the addition was complete, the mixture was heated to 120° C for 1 hour. There was obtained a 90 percent yield of 1,2-bis(dimethylchlorosilyl)ethane which solidified at 32° C.

There were added dropwise, 150 parts of diethylamine to a stirred solution at 10° C of 100 parts of the above bis(dimethylchlorosilyl)ethane dissolved in 1,000 parts of dry toluene. When the addition was complete, the mixture was heated to 110° C for one half hour. The amine salt was filtered off and the filtrate was distilled to yield 81 parts of product boiling at 80° C at 0.2 mm. Based on its infrared spectrum, the product was 1,2-bis(dimethyldiethylaminosilyl)ethane of the formula,

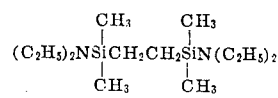

EXAMPLE 4

There was added at ½-hour intervals, 0.09 part of the above bis(dimethyldiethlaminosilyl)ethane, to 40 parts of a silanol-terminated polydimethylsiloxane at 100° C which had a viscosity of 3,200 centipoises at 25° C. After 0.72 part of the organosilylamine had been added, there was obtained a gum having an intrinsic viscosity [η] in toluene at 25° C of 1.4 dl/g. It was compounded with 40 parts of silica filler and press-cured at 150° C for 10 minutes with 2 percent by weight of benzoyl peroxide. An elastomer was obtained having a tensile (psi) of 790, and an elongation (percent) of 165 at break.

EXAMPLE 5

There were added dropwise 205 parts of dimethylchlorosilane over a period of several hours to 98 parts of diallylether containing 30 parts of the platinum catalyst of Example 3, per million parts of diallylether. The resulting mixture was then heated under reflux for 24 hours. Distillation of the mixture yielded 85 parts of a product having a boiling point of 107° to 110° C at 0.5 mm. The product was bis(dimethylchlorosilylpropyl)ether whose identity was confirmed by chlorine analysis and its infrared spectrum.

There were added 85 parts of the above bis(dimethylchlorosilylpropyl)ether to 80 parts of isopropylamine in 650 parts of dry toluene cooled in an ice bath. During the addition, the mixture was vigorously stirred. When the addition was complete, the mixture was heated to 110° C for 1.5 hours. The amine salt was filtered off and the filtrate was distilled to yield 30 parts of a product having a boiling point of 124°–126° C, at 0.3 mm. Based on its method of preparation and its infrared spectrum, the product was bisdimethylisopropylaminosilylpropyl)ether of the formula,

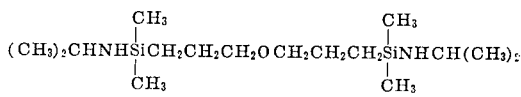

EXAMPLE 6

Increments of the bis(silylamino)ether of Example 5 were added to 40 parts of the silanol-terminated polydimethylsiloxane of Example 4 at 70° C. After 1.5 part of the amine had been added, there was obtained after several days, a soft gum having an intrinsic viscosity [η] in toluene at 25° C of 0.95 dl/g.

EXAMPLE 7

In accordance with the procedure of Example 3, 55 parts of dimethylchlorosilane were added to 65 parts of dimethylallylchlorosilane at a temperature of 90° C in the presence of 30 parts of platinum catalyst, per million parts of mixture. There was obtained 1,3-bis(dimethylchlorosilyl)propane; b.p. 93° C at 9 mm. The corresponding bis(dimethylaminodimethylsilyl)propane was prepared by the following procedure.

There were added 55 parts of dimethylamine to 65 parts of Cl(CH₃)₂iCH₂CH₂CH₂Si(CH₃)₂Cl in 550 parts of dry toluene at 0° C. When the addition was completed, the mixture was heated to 110° C for 30 minutes. The mixture was allowed to cool. It was then filtered and the filtrate was distilled. There was obtained 33 parts of a product having the formula, (CH₃)₂N(CH₃)₂SiCH₂CH₂CH₂Si(CH₃)₂N(CH₃)₂, based on its method of preparation and its vapor phase chromatograph.

A gum having an intrinsic viscosity [η] in toluene at 25° C of 1.1 dl/g was prepared by mixing the above bis(dimethylaminosilyl)propane with the silanol-terminated polymer of Example 6. The gum was compounded with 40 parts of filler, and press-cured with 1.6 percent benzoyl peroxide in accordance with the previously described procedure. A rubber was obtained having 1,230 tensile (psi), and 365 (percent) elongation at break.

EXAMPLE 8

By the method of G. Baum [J. Org. Chem. 23, 480 (1958)] 4,4'-bis(dimethylchlorosilylphenyl)ether is prepared by reaction of a 1.5 N n-butyl lithium solution with 4,4'-bis(bromophenyl)ether in benzene solution, followed by 3 hours reflux with dimethyldichlorosilane. The product is distilled from the reaction mixture and then reacted with a 10 percent stoichiometric excess of dimethylamine in hexane. The mixture is filtered, stripped and distilled. Based on method of preparation there is obtained

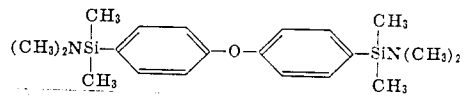

A mixture of 110 parts of the above organosilylamine, and 160 parts of a silanol-terminated polydimethylsiloxane having 10.5 percent by weight OH is stirred at −10° C under nitrogen. It is gradually heated to 60° C with stirring until no further evolution of dimethylamine is effected. There is obtained a silanol-terminated fluid having a molecular weight of about 2,500 and consisting of chemically combined

A mixture of 100 parts of the above fluid and 10 parts of methyltriacetoxysilane is blended under atmospheric conditions. An elastomer is obtained after 10 hours showing valuable insulating properties.

While the foregoing examples have been limited to only a few of the very many organosilylamines of the present invention, it should be understood that the present invention is directed to a much broader class of organosilylamines as shown by Formula (1), which can be made by effecting contact between halosilylorgano compounds of Formula (2) and various aliphatic or heterocyclic amines previously described.

It also should be understood that the present invention is also directed to a method for making a much broader class of organopolysiloxane polymers consisting essentially of chemically combined

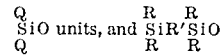

units, which can be in the form of silanol-terminated fluids, or gums, or fluids or gums terminated with R₃SiO units, Q₃SiO units, or mixtures thereof.

What I claim as new and desire to secure by Letters Patent of the United States is:

1. A method which comprises effecting contact between (A) an organosilylamine, and (B) a silanol-containing organosilicon material, at a temperature of from −30° to 200° C., to provide for the production of an adduct having a molecular weight higher than (A) or (B), where (A) is a member selected from, (a)  Y Si R' Si Y, with R groups
(b)  Y Si R' Si(O SiO₂)ₙ O Si R' Si Y, with R groups

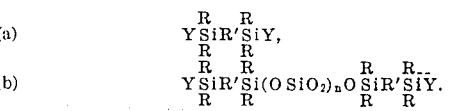

c. a mixture of a monofunctional silylamine of the formula,

R₃SiY, and a member selected from (a), (b) and mixtures thereof, and (B) is a member selected from, (d)   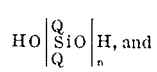   H, and e. a mixture of (d) and a member selected from said monofunctional silylamine and silanol-containing organosilicon material of the formula, $$Q(Q_2SiO)_mH,$$

where Y is a monovalent amino radical selected from — NZZ' and a heterocyclic amino radical, where Z is selected from alkyl radicals and Z' is selected from hydrogen and alkyl radicals, R is selected from the class consisting of monovalent hydrocarbon radicals, and halogenated monovalent hydrocarbon radicals, R' is a divalent radical selected from alkylene radicals, arylene radicals, alkylenearylenealkylene radicals, alkyleneoxyarylene radicals, and radicals of the formula, R"TR", R" is selected from the class consisting of alkylene and arylene radicals, T is selected from

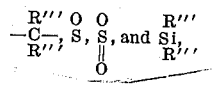

where R''' is selected from hydrogen and R radicals, n is an integer equal to from 1 to 1,500, inclusive, Q is selected from R radicals and cyanoalkyl radicals, m is an integer equal to from 3 to 1,000, inclusive, and the ratio of the sum of the R radicals and Q radicals per silicon atom, can have a value in the range of between about 1.95 to 2.4, inclusive.

2. A method in accordance with claim 1, which provides for the production of an organopolysiloxane gum having a viscosity of at least 500,000 centipoises at 25° C.

3. A method in accordance with claim 1, which provides for the production of an organopolysiloxane fluid having a viscosity between 30 centipoises to 100,000 centipoises at 25° C.

* * * * *